United States Patent [19]

Koseki

[11] Patent Number: 5,370,925
[45] Date of Patent: Dec. 6, 1994

[54] AIRBAG OF AIRBAG RESTRAINT SYSTEM

[75] Inventor: Tomohiro Koseki, Hamamatsu, Japan

[73] Assignees: Ikeda Bussan Co., Ltd., Ayase; Hamamatsu Industry Co., Ltd., Hamamatsu, both of Japan

[21] Appl. No.: 207,157

[22] Filed: Mar. 8, 1994

[30] Foreign Application Priority Data

Mar. 31, 1993 [JP] Japan ................. 5-096742

[51] Int. Cl.⁵ ............................ D03D 3/00
[52] U.S. Cl. ........................ 428/225; 139/389; 280/728 R; 428/36.1; 428/257; 428/258; 428/259; 428/296
[58] Field of Search ......... 428/225, 257, 258, 259, 428/296, 36.1; 139/389, 420 A; 280/728

[56] References Cited

U.S. PATENT DOCUMENTS 4,761,321  8/1988  McCall et al. ............. 428/257
5,236,775  8/1993  Swoboda et al. ........... 428/225

FOREIGN PATENT DOCUMENTS 54-69543   5/1979  Japan.
56-43890  10/1981  Japan.

Primary Examiner—James J. Bell
Attorney, Agent, or Firm—Foley & Lardner

[57] ABSTRACT

An airbag of an airbag restraint system mounted on an automotive vehicle and adapted to protect a vehicle passenger in a serious vehicle collision. The airbag is formed of a cloth which is basically constituted of warp and weft yarns made of a high melting point polymer material. Low melting point polymer yarns are woven in the cloth in a manner to extend along the warp and weft yarns. The low melting point polymer yarns are located at predetermined intervals, and have a melting point lower than that of the high melting point polymer material. The low melting point polymer yarns melt upon heating in a heat treatment so as to be welded to the high warp and weft yarns thereby securely binding the warp yarns together and the weft yarns together.

8 Claims, 4 Drawing Sheets

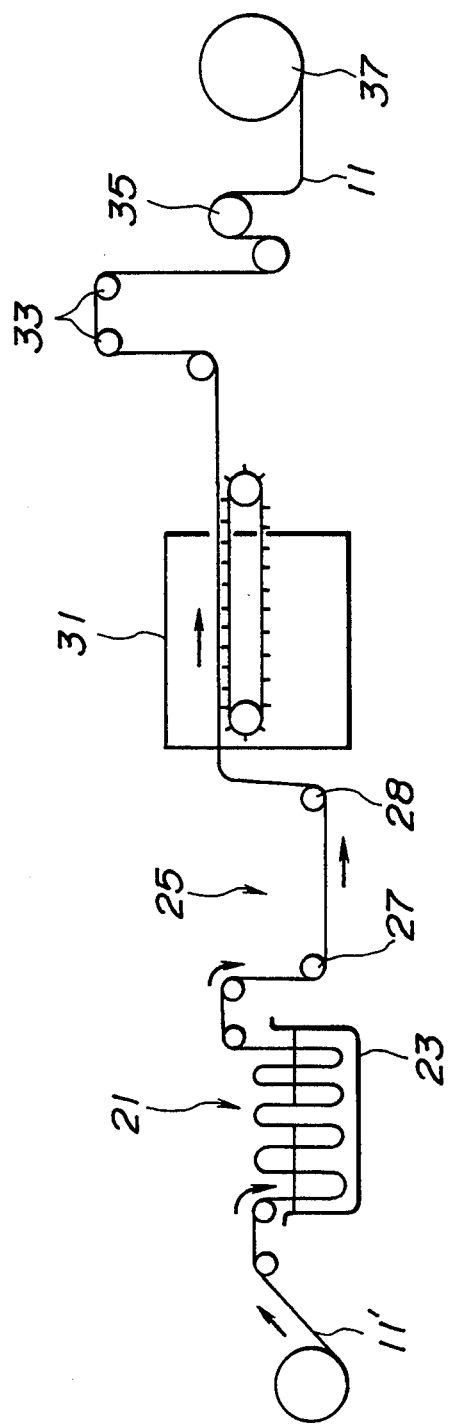

AIRBAG OF AIRBAG RESTRAINT SYSTEM

BACKGROUND OF THE INVENTION

1. Field of the Invention

This invention relates to improvements in an airbag of an airbag restraint system for protecting a vehicle passenger in the event of a serious vehicle collision or the like, and more particularly to a cloth constituting such an airbag as being connected to a gas generator and adapted to inflate upon being supplied with gas from the gas generator.

2. Description of the Prior Art

Hitherto a variety of airbag restraint systems have been proposed and put into practical use in the field of automotive vehicles. An example of the airbag restraint system is disclosed in Japanese Patent Publication No. 56-43890. An example of a device for securely retaining the airbag to a stationary side of the vehicle is disclosed in Japanese Utility Model Provisional Publication No. 54-69543.

Generally, such an airbag restraint system includes a gas generator which is fixed to a base plate installed to a stationary side of the vehicle such as an instrument panel or a steering wheel. An airbag is fixed to the base plate through a retainer and adapted to momentarily inflate upon being supplied with high pressure gas from the gas generator when the gas generator is operated in the event of a serious vehicle collision or the like.

The airbag is formed of cloth materials each of which is constituted of warp and weft yarns as basic materials. The warp and weft yarns are formed of high melting point polymer materials which have high melting points. The cloth materials are obtained by cutting a cloth in a manner to have predetermined shapes and areas.

For example, the airbag is formed of generally circular front and rear side cloth materials which are sewn at their peripheral portions with each other. The rear side cloth material is formed with a gas inlet opening through which high pressure gas from the gas generator is supplied.

Difficulties have been encountered in the above-described airbags of airbag restraint systems, in which fray is unavoidably made at the peripheral portions and the through-opening sections of the cloth materials in case of cutting the cloth materials by a press, thereby resulting in substandard airbags and degrading the efficiency of sewing operation of the airbag. In order to overcome these difficulties, it has been proposed to cut the cloth materials by using laser, a ultrasonic or cutter, a high frequency cutter. Additionally, the sewing operation is made upon folding the peripheral portions of the cloth materials.

However, the cutting by using laser or the like requires a high equipment cost and cannot improve the productivity of the airbag. Additionally such cutting techniques cannot be sufficiently effective to prevent the cloth materials from being frayed. The above-mentioned techniques of folding the peripheral portion of the cloth material peripheral portion is inferior from the economical view point particularly when a folded portion is large in size. Such folding also provides a disadvantage in that no folded portion can be formed particularly at the through-opening portions of the cloth material.

Furthermore, it has been also proposed to coat the cloth materials with a heat resistant synthetic resin material in order to prevent fray of the cloth materials. However, such a process for coating the resin material deteriorates the production line operation and makes the re-use of cloth materials difficult.

SUMMARY OF THE INVENTION

It is an object of the present invention to provide an improved airbag of an airbag restraint system in which the airbag overcomes drawbacks encountered in conventional airbags which are constituted of a cloth formed of conventional materials.

Another object of the present invention is to provide an improved airbag of an airbag restraint system which is high in quality, so that substandard products are prevented from being produced in a production process, while maintaining a sufficient sewing strength during inflation of the airbag upon operation of the airbag restraint system.

A further object of the present invention is to provide an improved airbag of an airbag restraint system, by which the cloth materials of the airbag can be prevented from being frayed at their cut portions thereby improving the operational efficiency of sewing the cloth materials to form the airbag while preventing the operational circumstances from being deteriorated in a production process.

A still further object of the present invention is to provide an improved airbag of an airbag restraint system which airbag does not require a high production equipment cost and makes possible re-use of the cloth materials of the airbag, thereby providing economical advantages.

An airbag of the present invention is for use in an airbag restraint system is made of a cloth which includes warp and weft yarns each of which is made of a high melting point polymer material. Low melting point polymer yarns are woven in the cloth in a manner to extend along at least one of the warp and weft yarns. The low melting point polymer yarns are located at predetermined intervals. At least a part of each low melting point polymer yarn has a lower melting point than the warp and weft yarns and is capable of melting upon heating at a temperature not lower than its melting point so that the low melting point polymer yarns are welded to the warp and weft yarns.

According to the present invention, the low melting point polymer yarns woven in the cloth formed mainly of the high melting point polymer yarns become molten under the heat treatment thereby being welded to the high melting point polymer yarns, so that the yarns are securely bound each other. Of course, the high melting point filaments of each yarn are securely bound to each other. Accordingly, even if cutting of the cloth is made by a press, no fray is produced at the peripheral portions and the through-opening portions of the cloth, thereby largely facilitating a sewing operation for forming the airbag from the cloths.

BRIEF DESCRIPTION OF THE DRAWINGS

FIG. 5 is a flow diagram of a production process of the cloth of FIG. 2; and

DETAILED DESCRIPTION OF THE INVENTION

Figure 1:
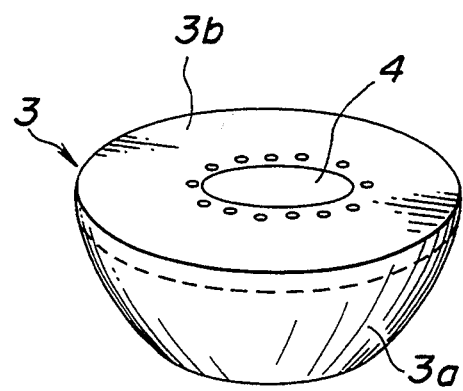
FIG. 1 is a perspective view of an embodiment of an airbag of an airbag restraint system, according to the present invention, in an inflated state.

Referring now to FIGS. 1 to 6, more specifically FIG. 1, of the drawings, an embodiment of an airbag according to the present invention is illustrated by the reference numeral 3. The airbag 3 forms part of an airbag restraint system of an automotive vehicle though not shown. The airbag is designed to momentarily inflate in the event of a serious vehicle collision in order to provide a soft cushion for vehicle passenger thereby protecting the vehicle passenger from coming into direct contact with either a steering wheel or windshield.

The airbag 3 in FIG. 1 is in an inflated state and includes a front side sheet-like member or cloth material 3a which faces the vehicle passenger. A rear side sheet-like member or cloth material 3b is sewn at its peripheral portion to the front side sheet-like member 3a at the peripheral portion. The rear side sheet-like member 3b is formed at its central portion with an opening 4 through which high pressure gas is supplied to inflate the airbag 3. It will be understood that high pressure gas is ejected from a gas generator (not shown) which is fixed to a base plate installed to a stationary side of the vehicle such as an instrument panel or a steering wheel, so that high pressure gas is momentarily directed into the airbag thereby momentarily inflating the airbag 3 to cushion the vehicle passenger.

Figure 2:
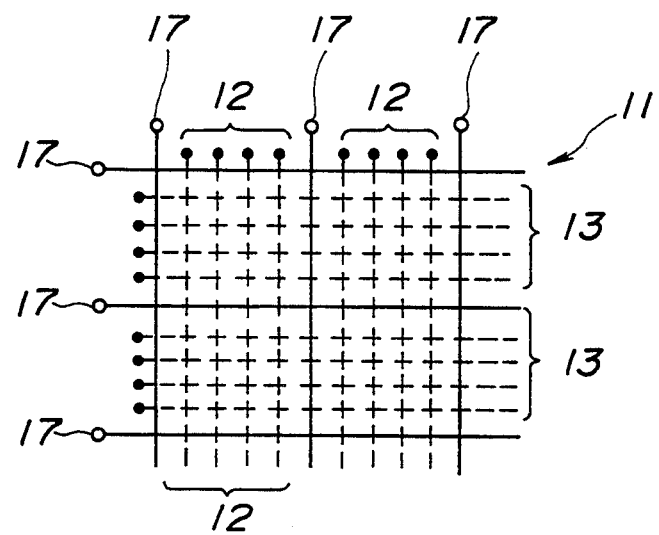
FIG. 2 is an explanatory view of a cloth constituting the airbag of FIG. 1.

As shown in FIG. 2, each of the front and rear side sheet-like members 3a, 3b includes a cloth or plain weave fabric 11 which is woven with basic weaving materials including warp yarns 12 and weft yarns 13. The warp and weft yarns 12, 13 are formed of a polymer material having a high melting point. The high polymer material is polyester or nylon 6, 6 which is high in heat resistance.

In this embodiment, low melting point yarns 17 are woven in the cloth 11 to extend along both the warp and weft yarns 12, 13, and located at suitable intervals as illustrated in FIG. 2. The low melting point yarns are formed of a polymer material such as polyester or nylon 6, 6 but are designed to have a melting point lower than that of the high melting point polymer warp and weft yarns 12, 13. The low melting point yarns 17 may be woven in the cloth 11 to extend along one of the warp and weft yarns 12, 13.

The low melting point yarns 17 are welded to the high melting point warp and weft yarns 12, 13 to securely bind the warp and weft yarns 12, 13, upon being heated at a temperature above the melting points of the low melting point yarns 17 during a production process of the cloth 11.

The airbag 3 is arranged to be inflated and projected into the vehicle passenger compartment under operation of the gas generator. Therefore, the cloth 11 of the airbag 3 has a high density yarns (the number per unit length of the cloth) of yarns to omit air-permeability thereof. In this regard, three examples of the cloth 11 (plain weave fabric) are illustrated having the following yarn densities (in weft and warp directions) of each of the warp and weft yarn 12, 13: (a) 36.8 yarns/inch in a case where the yarns 12, 13 are 840 denier; (b) 52 yarns/inch in a case where the yarns 12, 13 are 420 denier; and (c) 73.5 yarns/inch in a case where the yarns 12, 13 are 210 denier. It will be understood that the denier means a weight (g) per 9000 m.

It is sufficient that the low melting point polymer yarn 17 is lower in melting point than the high melting point polymer yarns 12, 13. It is preferable that the high melting point polymer yarns 12, 13 have a melting point ranging from 250° to 260° C., whereas the low melting point polymer yarn 17 has a melting point ranging from 210° to 230° C. Additionally, the high melting point polymer yarns 12, 13 have a physical property in which a tensile strength is 10 g/denier, and an elongation percentage of 15%, whereas the low melting point polymer yarn 17 has a physical property in which a tensile strength is 3 g/denier, and an elongation percentage of 40%. It will be understood that the elongation percentage is the percentage of elongation of the yarn relative to the initial length of the yarn.

It is preferable that the low melting point polymer yarns 17 are woven in the cloth in such an interval that 5 to 10 high melting point polymer yarns 12 or 13 are disposed between the adjacent low melting point polymer yarns 17. In this embodiment, the intervals at which the low melting point polymer yarns 17 are woven in the cloth are the same with respect to the warp yarns 12 and to the weft yarns 13, as shown in FIG. 2. It will be understood that the intervals may be different with respect to the warp yarns 12 and to the weft yarns 13 so that the intervals are not limited to a certain range.

Each of the above low melting point polymer yarns 17 is formed of the same filaments and each of the filaments is formed of the low melting point polymer material, not shown, but contained in the yarns 17 in FIG. 2. However, it will be appreciated that a variety of low melting point polymer yarns such as the other embodiments shown in FIGS. 3, 4A and 4B can be used for the same purpose as the polymer yarns shown in FIG. 2.

Figure 3:
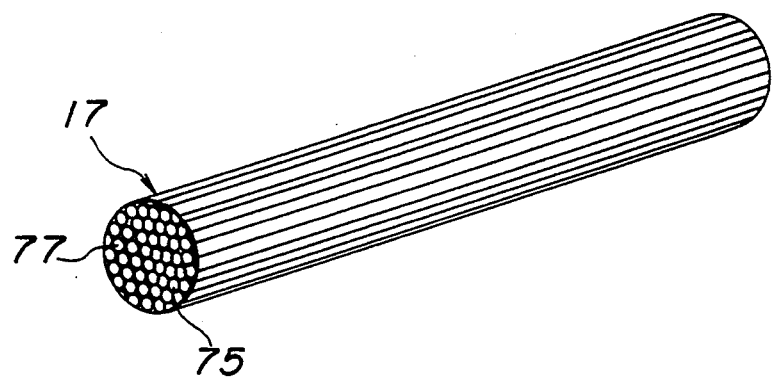
FIG. 3 is a fragmentary enlarged perspective view of an embodiment of one of low melting point polymer yarns used in the cloth of FIG. 2.

FIG. 3 illustrates another embodiment of the low melting point polymer yarns 17 in a state before being subjected to a heat treatment discussed after. In this example, each low melting point polymer yarn 17 is formed of high melting point polymer filaments 75 and low melting point polymer filaments 77 which filaments 75, 77 are welded and bounded together as a yarn. The low melting point polymer filament 77 is lower in melting point than the high melting point polymer filament 75.

The ratio (percent by weight) between the high melting point filaments 75 and the low melting point filaments 77 are 50:50 to 70:30. If the ratio of the low melting point filaments 77 is less than 30, the cloth tends to be easily frayed. This was experimentally confirmed by a fray characteristic test which was carried out by pulling a yarn at the peripheral portion of a cloth (having a dimension of 10 cm ×10 cm) and by reading a load on a load meter when the yarn was frayed from the cloth. This test revealed that the fray occurred at a load of 60 g in case that the ratio of the low melting point filaments 77 was 30; the fray occurred at a load of 45 g in case that the same ratio was 20; and the fray occurred at a load of 30 g in case that the same ratio was 10.

Figure 4A:
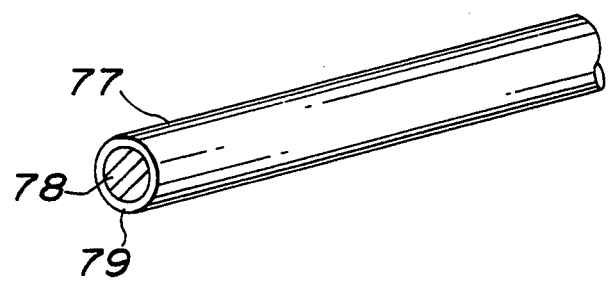
FIG. 4A is a fragmentary enlarged perspective view of an another embodiment of one of low melting point filaments constituting each yarn of the cloth of FIG. 2.

FIG. 4A illustrates a further embodiment of the low melting point polymer yarns 17 in a state before being subjected to a heat treatment discussed below. In this embodiments, each low melting point polymer yarn 17 is formed of a plurality of low melting point filaments 77 which are the same as each other. Each low melting point filament 77 includes a central and axially elongate high melting point section 78. A peripheral and axially elongate low melting point section 79 is integrally formed on the low high melting point section 78. The low melting point section 79 is coaxial with the high melting point section 78. The low melting point section 79 is lower in melting point than the high melting point section 78.

Figure 4B:
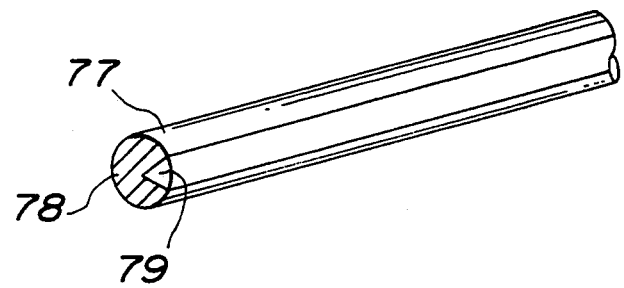
FIG. 4B is a fragmentary enlarged perspective view similar to FIG. 4A but showing another embodiment of one of the low melting point filaments.

FIG. 4B shows a modified embodiment of the low melting point polymer yarns 17 in a state before being subjected to a heat treatment discussed below. In this embodiment, the high melting point section 78 occupies a major part of each of the low melting point filaments 77, while the low melting point section 79 occupies a minor part of each low melting point filament 77. The low melting point section 79 axially extends and forms part of the outer peripheral surface of each low melting point filament 77.

Throughout the embodiments of FIGS. 4A and 5B, the ratio (in percent by weight) between the high melting point section 78 and the low melting point section 79 is not more that 70: not less than 30.

Next, a process of production of the cloth 11 of the airbag 3 will be discussed with reference to FIG. 5.

First, a cloth 11' as shown in FIG. 2 is woven including the low melting point polymer yarns 17 located at suitable intervals to extend along the high melting point polymer yarns 12, 13. This cloth 11' is carried to a refining device 21 including a refining bath 23 in which a NaOH aqueous solution is contained. The cloth 11' is dipped in the refining bath 23 at 60° to 90° C. for 2 minutes thereby to rinse and remove oily material coated on the yarns during a yarn spinning process.

Subsequently, the cloth 11' is passed through two spaced rollers 27, 28 of a texture correcting device 25 to correct the deformation of the texture of the cloth 11. After being drawn from the texture correcting device 25, the cloth 11 is carried to a heating furnace 31 to be subjected to a heat treatment, in which the cloth 11 is heated at 220° to 230° C. for 1 minute so as to be dried and heated. At this time, the low melting point polymer yarns 17 are molten because they have a melting point of 210° to 230° C., thereby welding to the high melting point polymer yarns 12, 13. As a result of the low heating point, the high melting point polymer warp yarns 12 are securely bound with each other, and the high melting point polymer weft yarns 13 are securely bound with each other.

It will be understood that the high melting point polymer yarns 12, 13 remain unmelted because they have a melting point of 250° to 260° C., so that only the low melting point polymer yarns 17 are molten.

In the embodiment where each low melting point polymer yarn 17 is formed of the high and low melting point filaments 75, 77 as shown in FIG. 3, only the low melting point filaments 77 are molten so as to weld to the high melting point polymer yarns 75. This securely joins the high melting point filaments 75 and the high melting point polymer yarns 12, 13.

In the embodiment where each low melting point filament of the low melting point yarn 17 includes the high melting point section 78 and the low melting point section 79 as shown in FIGS. 4A and 4B. Of these sections, only the low melting point section 79 is molten thereby joining the high melting point sections 78 of the low melting point yarns 17 and the high melting point polymer yarns 12, 13.

Subsequently, the cloth 11' is drawn from the heating furnace 31 and passed through rollers 33, 35 to be cooled. At this step, the deformation of the texture of the cloth 11' is again adjusted thus obtaining the cloth 11 which has been processed as discussed above. Thereafter, the cloth 11 is rolled up by a take-up device 3.

Figure 6:
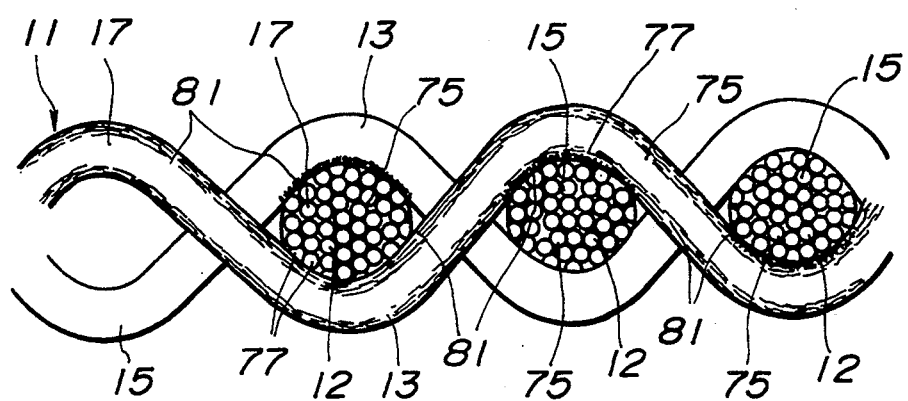
FIG. 6 is an enlarged cross-sectional view of a cloth constituting the airbag of FIG. 1, showing a state in which low melting point polymer yarns are welded to high melting point polymer yarns.

FIG. 6 shows an example of the processed cloth 11 which is produced in the above-mentioned manner. The processed cloth 11 includes the low melting point polymer yarns 17 which are woven in the cloth to extend along the warp yarns 12 and the weft yarns 13. Each low melting point polymer yarn 17 includes the high melting point filaments 75 and the low melting point filaments 77 as shown in FIG. 3. The low melting point filaments 77 of the low melting point polymer yarns 17 are molten upon the heat treatment thereby to securely bind or join the high melting point filaments 75 of the low melting point polymer yarns 17 and the high melting point polymer (warp and weft) yarns 12, 13. Reference numeral 81 in FIG. 6 denotes a molten portion of the low melting point filaments 77.

As appreciated from the above, according to the embodiment of the airbag of the present invention, the low melting point polymer yarns 17 woven in the cloth mainly formed of the high melting point polymer yarns 12, 13 are molten and welded under the heat treatment thereby securely binding or joining the high melting point polymer yarns 12, 13. Of course, the high melting point filaments of each yarn 12, 12 are securely bound each other. Accordingly, even if cutting of the cloth 11 is made by a press, no fray is produced at the peripheral portion and a through-opening portion of the cloth, thereby facilitating a sewing operation for forming the airbag 3 from the cloths 11.

What is claimed is:

1. An airbag of an airbag restraint system, comprising:
a cloth including warp and weft yarns each of which is made of a high melting point polymer material;
low melting point polymer yarns which are woven in said cloth in a manner to extend along at least one of said warp and weft yarns, said low melting point polymer yarns being located at predetermined intervals, at least a part of each low melting point polymer yarn being lower in melting point than said warp and weft yarns and capable of melting upon heating at a temperature not lower than its melting point so that said low melting point polymer yarns are welded to said warp and weft yarns.

2. An airbag as claimed in claim 1, wherein each of said low melting point polymer yarns includes low melting point filaments which are lower in melting point than said warp and weft yarns, and high melting point filaments which are higher in melting point than said low melting point filaments.

3. An airbag as claimed in claim 1, wherein each of said low melting point polymer yarns includes low melting point filaments each of which includes an axially extending central section which has a melting point higher than said at least a part of each low melting point polymer yarn, and a peripheral section which is coaxial and axially extending with said central section, said peripheral section having a melting point lower than that of said warp and weft yarns.

4. An airbag as claimed in claim 1, wherein each of said low melting point polymer yarns includes low melting point filaments each of which includes a major part having a melting point higher than said at least a part of each low melting point polymer yarn, and a minor part which axially extends and forms part of a peripheral surface of each low melting point filament, said minor part having a melting point lower than that of said warp and weft yarns.

5. An airbag as claimed in claim 1, wherein said at least a part of each low melting point polymer yarn is in an amount of not less than 30% by weight of each low melting point polymer yarn.

6. An airbag as claimed in claim 1, wherein each of low melting point polymer yarns is formed of a material which is one selected from the group consisting of polyester and nylon 6,6.

7. An airbag as claimed in claim 1, wherein said high melting point polymer warp and weft yarns have a melting point ranging from 250° to 260° C., and said low melting point polymer yarns have a melting point ranging form 210° to 230° C.

8. An airbag as claimed in claim 1, wherein said cloth is subjected to a heat treatment in which the cloth is heated at a temperature greater than the melting point of said at least a part of said low melting point polymer yarn.

* * * * *